Dec. 16, 1958  F. G. PARIS ET AL  2,864,235
EXHAUST GAS EJECTOR TUBES IN ASSOCIATION WITH
EXPLOSION ENGINES OR INTERNAL
COMBUSTION ENGINES
Filed March 6, 1953  3 Sheets-Sheet 1
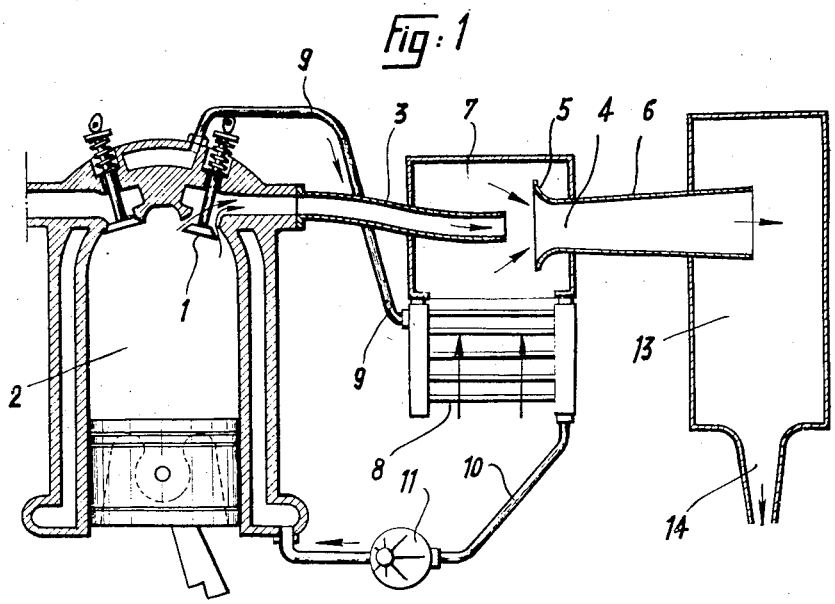
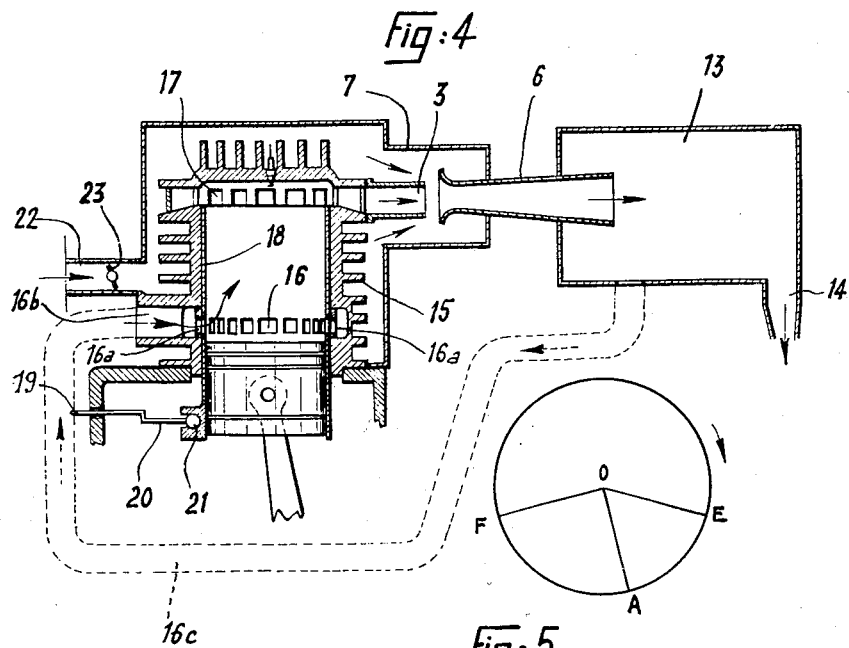
INVENTORS
François G. Paris
Jean Le Foll
Henri L. P. Mealien
Jean H. Bertin
By Watson, Cole, Grindle &
Watson
ATTORNEYS

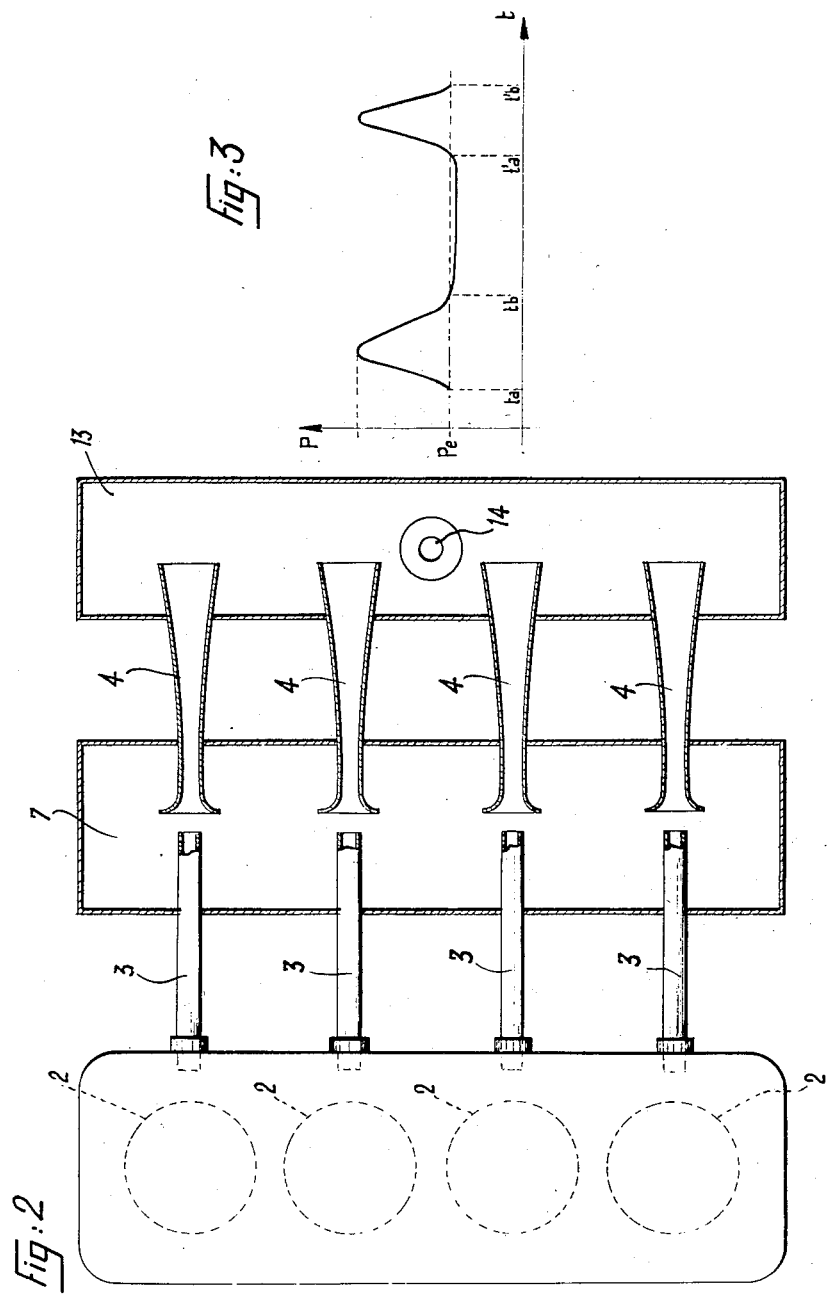

Dec. 16, 1958  F. G. PARIS ET AL  2,864,235
EXHAUST GAS EJECTOR TUBES IN ASSOCIATION WITH
EXPLOSION ENGINES OR INTERNAL
COMBUSTION ENGINES
Filed March 6, 1953  3 Sheets-Sheet 3

INVENTORS
François G. Paris
Jean Le Foll
Henri L. P. Meulien
Jean H. Bertin
By Watson, Cole, Grindle & Watson
ATTORNEYS United States Patent Office 2,864,235
Patented Dec. 16, 1958

2,864,235

EXHAUST GAS EJECTOR TUBES IN ASSOCIATION WITH EXPLOSION ENGINES OR INTERNAL COMBUSTION ENGINES

François G. Paris, Chaville, Jean Le Foll, Le Pré-Saint-Gervais, Henri L. P. Meulien, Courbevoie, and Jean H. Bertin, Neuilly-sur-Seine, France, assignors to Societe Nationale d'Etude et de Construction de Moteurs d'Aviation, Paris, France, a company of France Application March 6, 1953, Serial No. 340,835

Claims priority, application France March 14, 1952

1 Claim. (Cl. 60—30)

The use of the exhaust gases of an explosion engine or an internal combustion engine to induce in an ejector tube a flow of air which can be used for cooling the engine has already been suggested. The term "ejector tube" will be used, in the ensuing description and claims, to designate an aerodynamically-operating device which entrains a fluid through the agency of a high-velocity fluid-jet.

In these previous proposals, however, the operation of the ejector tubes was designed for steady air flow, following the technique described in present technical literature, and great efforts were made to lead into one single ejector tube the puffs or exhaust gas delivered from the various cylinders, or from a fairly large number of cylinders, of an engine in such a way that these exhaust puffs partly overlap thus giving a resultant flow which approximates to a steady or continuous flow.

In order to give the exhaust gas flow a still more continuous character, it has even been suggested to mix with the exhaust gases, before their entry into the ejector tube, compressed air taken from the delivery side of the supercharger compressor of the engine.

On the other hand, the applicants have found that, far from being an advantage, the transformation of the successive puffs of gas delivered from the various cylinders into a practically continuous flow, before their admission to a single ejector tube common to all the cylinders, results in the loss of a very large quantity of the energy which could be used for inducing a current of air, and this is to a large extent the cause of the disfavour into which ejector tubes have fallen, as they have been generally considered to be devices having a very low efficiency and possessing very little interest.

The applicants have found that the pulse of exhaust gas, at the moment when it escapes from each cylinder, has a very large energy content and also that if this pulse is directed to a suitably designed ejector tube in such manner that the pulsatory nature and the speed of the pulse are reduced as little as possible, it is possible to obtain an excellent recovery of the energy which it possesses, the ejector tube then forming a pulsatory compressor, the high efficiency and the simplicity of which allow not only old applications to be taken up again with success but also enable new applications to be put into use.

The following considerations may conveniently be indicated here:

(1) In a multi-cylinder engine, the exhaust deliveries of the various cylinders are separated and each associated with a different ejector tube in such a way that the pulsatory nature of the individual puffs of exhaust gas is not altered. In the case of a four-stroke engine, it is however permissible to apply the exhaust deliveries from two to more cylinders to one single ejector tube provided that the moments of ignition of these cylinders are spaced apart by $2\pi$. In the case of a two-stroke engine, it is also permissible to lead into the same ejector tube the exhaust gases of two or more cylinders, the moments of ignition of which are spaced apart by $\pi$, but only on condition that the puffs of exhaust gas are short and do not overlap.

(2) The piping system which connects the exhaust port of each cylinder with the ejector tube must be short, its walls must be smooth and without any sharp bends and the diameter of the piping must be large enough not to impair the speed of the puffs of gas.

(3) The ejector tube should have an internal volume at least equal to the volume of air or of fresh gas to be passed through with each puff of exhaust gas and this condition must apply at the maximum output of the engine. As far as the upper limiting value of the internal volume of the ejector tube is concerned, this depends on the desired ratio of compression and also whether the tube delivers into a reservoir in which it maintains a gas pressure. The length of the ejector tube and, in consequence, its volume, will increase with increasing values of the desired ratio of compression but it must be observed here that, on the other hand, the output of the ejector tube decreases as its length increases. In practice, the internal volume of the ejector tube will be between 100% and 200% of the volume of air or of fresh gas to be drawn in at each pulse.

(4) In cases where the ejector tube (or the tubes associated with different cylinders and operating in parallel) delivers into a storage space or chamber where it maintains a gas pressure, it must be so designed as to prevent any back flow of compressed gas from the chamber between two pulsations. This condition entails the provision of ejector tubes, the length of which must be in direct relation to the pressure maintained in the chamber (the higher the pressure the longer the tube must be), in order to prevent any tendency to reversal of gas flow, which tendency is prevented by the kinetic energy of the volume of gas which is still in movement inside the ejector tube towards the storage chamber.

In its applications, both on the ground and in aviation, the invention can be used for the cooling of engine cylinders, whether the cylinders are water-cooled or air-cooled or it may also be used for scavenging cylinders, or again for cooling and scavenging.

Furthermore, if the ejector tubes are arranged to deliver into a storage chamber which in turn delivers to atmosphere by a suitably dimensioned nozzle, there is then obtained in this nozzle a practically continuous gas flow.

In this way, it is possible to muffle the noise of the exhaust by much more simple means than the usual exhaust box or "silencer".

In the case of aero-engines, the jet of gas flowing from the nozzle may contribute to the propulsion by reaction as it gives an appreciable thrust.

The description which follows below in connection with the attached drawings, which are given by way of example and not in any sense of limitation, will make it quite clear how the invention can be carried into effect, the special features referred to, either in the text or in the drawings, forming, naturally, part of the said invention.

Fig. 1 is a diagrammatic view in vertical section of a water-cooled engine cylinder and of a pulsatory ejector tube which is associated with it.

Fig. 2 is a view in horizontal projection showing the pulsatory ejector tubes of a four-cylinder engine.

Fig. 3 shows the variations of exhaust gas pressure from a cylinder (in the pipe which supplies the corresponding ejector tube) as a function of time.

Fig. 4 is a view similar to that of Fig. 1 showing the application of a pulsatory ejector tube to the cooling and scavenging of a two-stroke engine with air cooling.

Fig. 5 is a diagram illustrating the operation of this engine.

Figure 6:
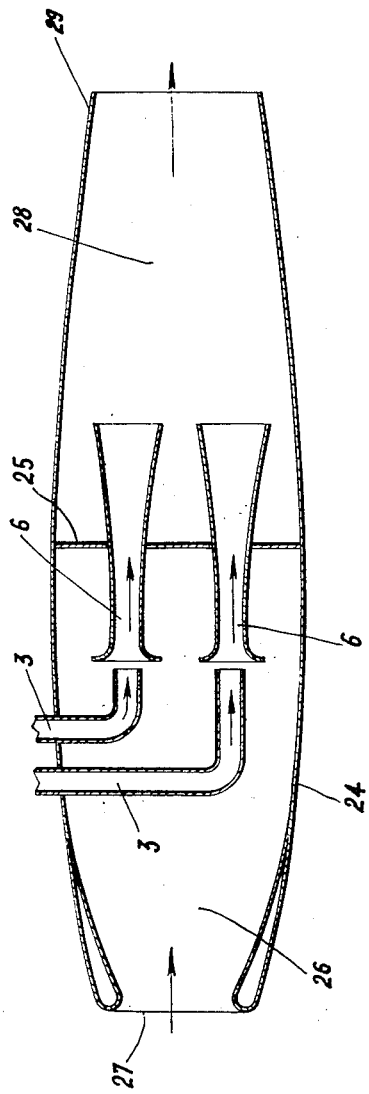
Figs. 6 and 7 are diagrammatic views in longitudinal section of two methods of arrangement of a cowling containing the pulsatory ejector tubes associated with the cylinders of an aircraft engine.

In the embodiment of Figs. 1 and 2, the invention is supposed to be applied to a four-stroke, four-cylinder engine. The exhaust valve 1 of each of the cylinders 2 opens into an exhaust pipe 3 which is short, has no sharp bends and the cross-sectional area of which, according to circumstances, lies between the maximum passage area afforded by the valve 1 when it is open, and the mean value of the passage area during the exhaust period. This pipe 3 delivers the exhaust gases to an ejector tube 4 comprising a short convergent section 5, followed by a relatively long divergent section 6 of relatively small cone angle.

As shown in Fig. 2, there is thus a tubular member 3 and an ejector tube 4 for each of the cylinders of the engine. The convergent parts 5 of the various ejector tubes open into a common chamber 7 which communicates with the atmosphere through the cluster of tubes 8 of the radiator through which passes the cooling water of the engine. The hot water is taken off from the top of the water-jacket of the cylinder group by the pipe 9, passes through the cluster of tubes 8 and returns through a pipe 10 and a pump 11 to the base of the water-jacket.

In the diagram of Fig. 3, the pressures P in one of the tubes 3 are given as ordinates and the times $t$ as abscissae. $P_e$ is the pressure obtaining in the chamber 7 from which the ejector tubes evacuate gas. From $t_a$ to $t_b$ during a period of the order of one third or one quarter of the period $t'_a$—$t_a$ of the engine cycle, the exhaust gases from the cylinder flow in the pipe 3 and operate in the corresponding ejector tube by pushing through it the fresh air with which the ejector tube was previously filled, exactly as a piston would do. From $t_b$ to $t'_a$ the ejector tube refills with fresh air. From $t'_a$ to $t'_b$ this air is forced out by the following exhaust puff and so on.

It can be shown that the efficiency of the pulsatory ejector tube thus constructed is very much superior to that of an ejector tube operating on a continuous flow or substantially continuous flow where the fluid is carried along partly by the throttling effect of the inducing stream on the induced stream and by friction between said streams, this friction involving inevitably losses of energy.

The arrangement described is of interest in the case of a stationary engine, since it produces at no extra cost the necessary flow of cooling air. It is also advantageous for an engine mounted on a vehicle in that, by its use, the usual fan may be dispensed with. Its use even permits the radiator to be situated out of the flow of air caused by the motion of the vehicle and to screen it off completely, which feature can be of great utility on armoured vehicles.

If the ejector tubes 6 are arranged to deliver into a common chamber 13 provided with an exhaust nozzle 14 to atmosphere, situated preferably out of line with the axis of these ejector tubes, there is obtained through this nozzle 14 a practically continuous flow of air and gas. The noise of the exhaust is thus muffled by more simple means than the normal type of silencer with baffle-plates. As there then exists a back-pressure in the chamber 13, the ejector tubes must be designed so as to prevent a return flow of gas from the chamber 13 through the ejector tubes during the intervals between the peaks of exhaust gas pressure. This can be achieved by making the ejector tubes of a certain length so as to increase the time of flow through the tube of the mixture of air and gas following each exhaust puff. In this way it can be arranged that the emptying of an ejector tube into the chamber 13 has not been completed at the moment of arrival of the succeeding puff, the reflux of air from the chamber 13 through the ejector tube being thus prevented by the column of air and gas still in movement in the ejector tube.

Generally speaking, any increase in the length of the ejector tube is conducive to an increase of pressure in the chamber 13, but this increase is obtained at the expense of output from the ejector tube.

In the embodiment of the invention shown in Figs. 4 and 5, the suction of the ejector tubes from the chamber 7 is utilised not only for the cooling of the engine, which is supposed to be of the air-cooled type and provided to this end with cooling fins 15 on its cylinders, but also to scavenge the cylinders at the end of the exhaust period.

The engine shown is of the two-stroke injection type comprising air admission ports 16 at the base of the cylinder and exhaust ports 17 near the head. These ports are operated by a sleeve 18 mounted inside the cylinder and given a reciprocating motion by means of a rotating arm 19 and a crank 20, the swivel bearing 21 of which is connected to the sleeve.

The chamber 7 surrounds the cylinders and communicates with the atmosphere through a nozzle 22. The suction of the ejector tubes from this chamber creates in it a certain depression. Atmospheric air thus enters by the nozzle 22 and cools the cylinders by passing over the fins 15.

Furthermore, when at the end of the exhaust stroke, the ports 16a of the sleeve 18 uncover the ports 16 in the walls of the cylinder whilst the exhaust ports 17 are still open, atmospheric air is drawn in towards the chamber 7 through the cylinder and the exhaust pipe 3, thereby scavenging the cylinder.

If we now examine the diagram represented in Fig. 5, in which the radius OE corresponds to the beginning of the exhaust stroke (opening of ports 17), we see that it is sufficient to open the admission ports 16 from the position OA of the crank-shaft, to the point at which the pressure in the cylinder has become equal to that of the atmosphere. The admission and exhaust ports are then reclosed simultaneously when the crank-shaft is at OF, the angle included between the radii OA and OF thus corresponding to the scavenging period. With a sleeve 18 operated by a crank and which in consequence, has a reciprocating motion parallel to its axis and a reciprocating movement of rotation about that axis, it is easy to arrange the ports 16a of the sleeve in such a way that they only coincide with the ports 16 of the cylinder at a certain interval after the opening of the exhaust ports 17 by the upper end of the sleeve.

It is an advantage to provide the cooling air inlet orifice with a valve or tap 23, the opening of which can be regulated so that the losses of pressure in the cooling air circuit and the scavenging air circuit are equal.

In Fig. 4 is also shown a chamber 13 into which the ejector tubes of the cylinder discharge, and which acts as a silencer.

A part of the gases under pressure in the chamber 13 can be used to assist the scavenging action by returning these gases, in which the oxygen content can be approximately the same as that of pure air (5 to 15% of burnt gas) into the inlet system of the engine at the moment when the inlet ports open. In the case of a Diesel engine, for example, this possibility offers a certain advantage from the point of view of pre-heating of the mixture.

In order to effect this, instead of the inlet manifold 16b being open to atmosphere, it may be connected by a pipe 16c (shown in dotted outline on Fig. 4) to the chamber 13 in which the ejector tubes maintain a certain pressure. In such a case, it is of course necessary to leave the valve 23 open to some extent so as to obtain an adequate supply of air to the chamber 13 through the ejector tubes.

The embodiment of the invention shown in Fig. 6 concerns the utilisation of puffs of exhaust gas and ejector tubes in obtaining a propulsion effect.

The exhaust pipe 3 of the various cylinders of an engine (not shown) delivers the exhaust into ejector tubes 6 which are disposed in the interior of a cowling 24 and mounted on a partition 25 which divides this cowling into two parts. The part 26 opens through an orifice 27 facing the direction of travel of the movable body to be propelled whilst the part 28 opens to the rear through a nozzle 29.

The ejector tubes 6 act as compressors which, by the effect of the puffs of exhaust gas, increase the level of pressure in the chamber 28. The mixture of air and gas under pressure which is contained in this chamber 28 expands through the nozzle 29 in the form of a practically continuous jet which produces a propulsive effect by reaction.

This effect is additional to that of the airscrew which is driven by the engine.

In Fig. 6, only two ejector tubes 6 have been shown, but there may be a large number of them employed, according to the number of cylinders of the engine.

Figure 7:
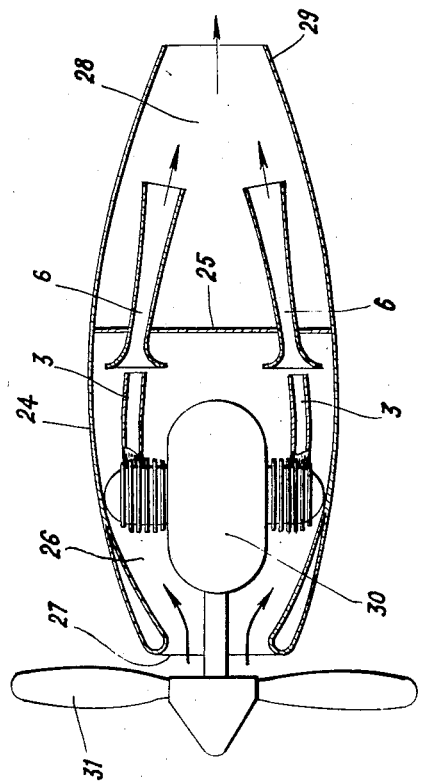

In the modification shown in Fig. 7, the cowling 24 encloses the engine 30 (supposed to be of the radial type) which drives the propeller 31, co-axial with the cowling.

By this means, the air drawn in by the ejector tubes in the portion 26 of the cowling, where the engine is housed, effects at the same time the cooling of the cylinders, which are provided with suitable fins.

As has already been stated in the preamble, it is possible to depart to a certain extent from the principle that one single cylinder is associated with each ejector tube. There is, of course, no disadvantage in causing the exhaust of several cylinders which fire at the same time to deliver into a single ejector tube. In the case of a four-stroke engine, it is also possible, without interfering with the pulsatory operation of the ejector tubes, to deliver into a single ejector tube the exhaust gases of cylinders, the moments of ignition of which are spaced apart by $2\pi$. In the case of a two-stroke engine, the cylinders whose moments of ignition are spaced part by $\pi$, can also be connected to a single ejector tube when the duration of each puff of the exhaust is sufficiently short.

It will be well understood that modifications can be made to the various embodiments of the invention which have been described, in particular by substitution of equivalent technical means without departing from the spirit of the present invention.

What we claim is:

A power plant comprising an internal combustion piston engine with a plurality of sequentially operating cylinders provided with scavenging ports, an engine cooling system having a cool air circuit, a separate exhaust pipe for each of the said cylinders, a tube operatively associated with each exhaust pipe to form with it an ejector, a common suction chamber into which the said exhaust pipes open through their discharge ends and the said tubes open through their suction ends, the said suction chamber communicating with the said cool air circuit, a common discharge chamber into which the said tubes open through their discharge ends, the said chambers communicating with each other through the said tubes and being otherwise sealed from each other, and means for exhausting the said discharge chamber, the said means comprising a pipe conection between the said discharge chamber and the said scavenging ports.

References Cited in the file of this patent

UNITED STATES PATENTS

| | | |
|---|---|---|
| 939,844 | Lehmann | Nov. 9, 1909 |
| 1,704,297 | Leipert | Mar. 5, 1929 |
| 1,938,537 | Davis | Dec. 5, 1933 |
| 2,178,297 | Birkigt | Oct. 31, 1939 |
| 2,383,385 | Heintze | Aug. 21, 1945 |
| 2,396,911 | Anxionnaz et al. | Mar. 19, 1946 |
| 2,401,941 | Lee | June 11, 1946 |
| 2,583,651 | Horning | Jan. 29, 1952 |
| 2,653,585 | Wallace | Sept. 29, 1953 |
| 2,750,733 | Paris et al. | June 19, 1956 |

FOREIGN PATENTS

| | | |
|---|---|---|
| 4,974 | France | Nov. 25, 1905 |
| 517,405 | France | Dec. 17, 1920 |
| 556,947 | France | Apr. 24, 1923 |
| 916,985 | France | Sept. 2, 1946 |